Oct. 22, 1946.  O. H. PEARSON  2,409,954
HEATING ATTACHMENT FOR HORNS
Filed Feb. 10, 1945
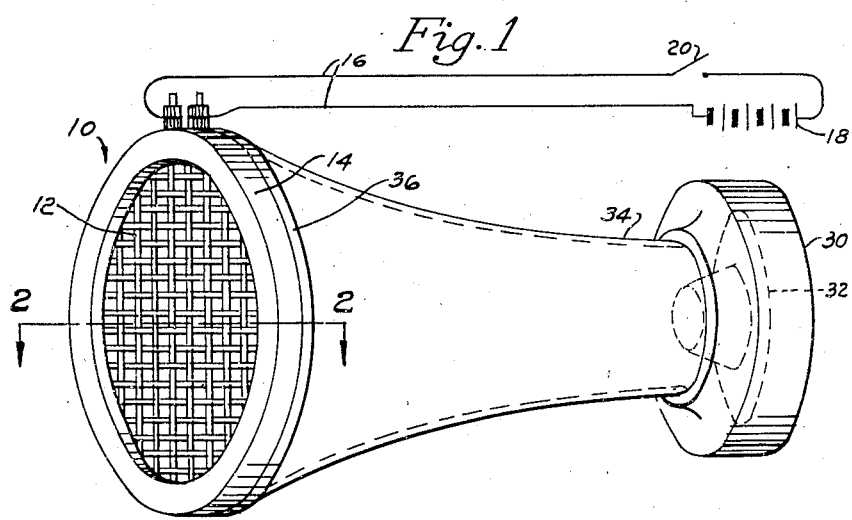
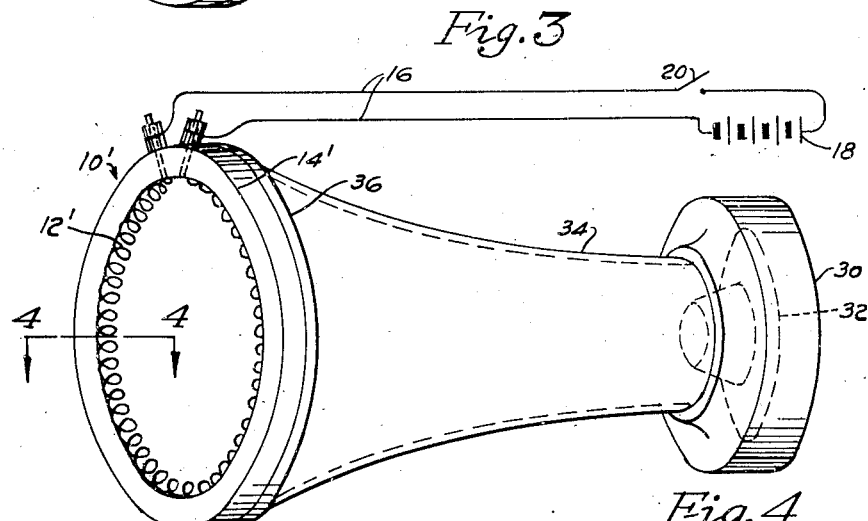
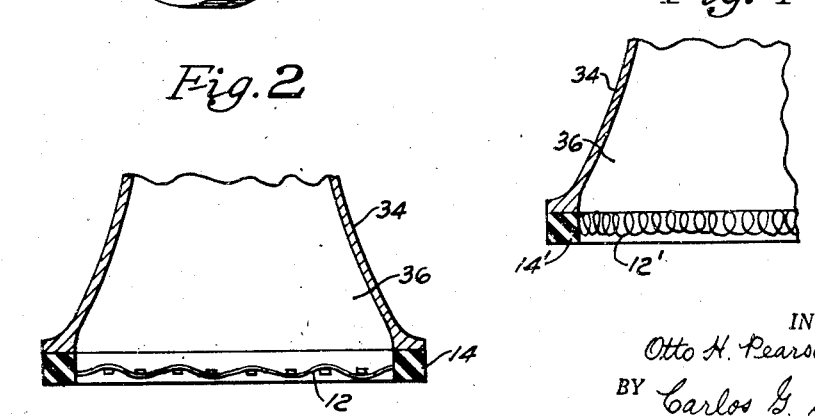
INVENTOR.
Otto H. Pearson
BY Carlos G. Stratton
ATTORNEY Patented Oct. 22, 1946

2,409,954

UNITED STATES PATENT OFFICE 2,409,954

HEATING ATTACHMENT FOR HORNS

Otto H. Pearson, Salt Lake City, Utah

Application February 10, 1945, Serial No. 577,221

6 Claims. (Cl. 219—19)

This invention relates to a heating device for horns, particularly for air pressure operated horns such as are used on buses or in other exposed locations where melted snow or sleet may enter the throat of the horn and then freeze, thereby rendering the horn inoperative and contributing to accidents.

The principal object of my invention is to provide a heating device for the mouth of a mechanically operated horn, and particularly of an air pressure operated horn which is a type of horn frequently rendered inoperative in freezing weather.

Another object of my invention is to provide an electric heating device in the form of a screen grid covering the mouth of a horn for melting the snow, sleet or ice which would normally enter or form in the horn, and for keeping them melted.

Another object of my invention is to provide a heating device in the form of an electric resistance heating coil extending around the mouth of a horn to keep the working parts from being rendered inoperative by the freezing of any moisture or condensation present in the parts.

A further object of my invention is to provide a heating device either integral with the mouth of a vehicle horn, or as an attachment therefor, which takes advantage of this forward location of said device, to warm the air currents constantly being forced into the throat of the horn during travel of the vehicle, preventing the freezing of any moisture which may have gained access to the sound producing mechanism in said horn.

In the drawing:

Fig. 1 is a schematic isometric view of a horn equipped with a screen grid heating attachment;

Fig. 2 is a horizontal sectional view taken on the line 2—2 of Fig. 1;

Fig. 3 is a schematic isometric view of a modified form and showing a heating coil adjacent the mouth of said horn; and Fig. 4 is a horizontal sectional view taken on the line 4—4 of Fig. 3.

My invention comprises a heating attachment 10 designed for use on any conventional signaling horn or similar device, which may be rendered inoperative by the freezing of moisture present in its working parts, and particularly on an air pressure operated horn 30. Air horns for use on buses or other vehicles, are well known in the art and are characterized by a vibrator 32, a sound amplifying throat portion 34 ending in a mouth 36. The moisture may enter the horn either in the air which operates the vibrator 32, or in the form of rain, sleet or snow which enters the mouth of the horn.

The form of heating attachment 10 shown in Figs. 1 and 2 is designed to melt the snow, sleet, or ice which would ordinarily enter the mouth portion 36 and collect in the throat 34. Said attachment 10 will also warm both the air entering the horn and the heat conducting metal parts of the horn, and thereby prevent the moisture already present in the horn from freezing. In this form of my invention, the heating attachment 10 consists of an electrical resistance in the form of a screen grid 12, of any suitable type, supported across the mouth portion 36 by any suitable insulation material 14. I have illustrated the insulation material 14 in the shape of a ring conforming to the shape of the mouth portion 36, although it will be understood that other forms of insulating means may be employed, and that they may be fastened to said mouth portion 36 by being moulded thereon or by any desired form of mechanical fastening means (not shown). Also, the screen grid 12 may be attached to said insulating material 14 in any desired manner. Conductors 16 supply current to the screen grid 12 from any suitable source 18 whenever switch 20 is closed by the operator.

In the modification shown in Figs. 3 and 4, I have employed the same reference numerals to designate the parts having the same construction as in Figs. 1 and 2, and I have used primed numerals to designate the parts corresponding in function but differing in construction.

In Figs. 3 and 4, my heating attachment 10' is made from a heating coil 12' which extends around the inner periphery of mouth portion 36, and is supported in that position by any suitable means such as the ring of insulating material 14' carried by said mouth portion 36. The heat given off by coil 12' is intended to warm the air entering the throat 34 of the horn 30, and thereby prevent the freezing of any moisture which may be present in the working parts of said horn. The radiant heat will also warm the throat and body of said horn, if it is made of metal or other heat conducting material, and thereby act as an additional safeguard against freezing.

While I have illustrated and described what I now regard as the preferred embodiments of my invention, the construction is, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. A heating device comprising: a ring of insulating material shaped to conform to the mouth of a horn; an electrical resistance fabric supported by said material; said fabric being designed for location over the mouth of said horn and in the path of air currents entering said mouth for warming said air; and means for conducting current to said element.

2. The combination with a horn having a vibrator in its throat and a sound amplifying mouth portion; of a reticulate fabric adjacent and covering said mouth portion; means for conducting current to said fabric for warming the air entering said mouth portion, whereby said vibrator is prevented from being rendered inoperative by the freezing of moisture present in the horn, and an insulating body for mounting said reticulate fabric on the lip of said horn.

3. The combination with a horn having a vibrator in its throat and a sound amplifying mouth portion; of an electrical resistance heating disk of open mesh fabric mounted over said mouth portion; said element being located in the path of air currents entering said mouth for warming said air; insulating means for supporting said disk on said horn; and means for conducting current to said element.

4. The combination with a horn having a vibrator in its throat and a sound amplifying mouth portion; of an electrical resistance screen grid mounted across said mouth portion for warming the air and melting the snow entering said mouth portion; insulating means for supporting said screen grid on said horn; and means for conducting current to said screen grid.

5. A heating attachment for a horn having a vibrator in its throat and a sound amplifying mouth portion, comprising: an electrical resistance screen grid shaped to extend across said mouth portion; insulating means for supporting said screen grid in its position across said mouth portion; and means for conducting current to said screen grid.

6. A heating attachment for a horn having a vibrator in its throat and a sound amplifying mouth portion, comprising: an annulus of insulating material adapted to be attached to the lip of the mouth portion of the horn, said annulus provided within the area defined thereby with a plurality of relatively closely spaced electrical resistance wires forming a mesh extending across the mouth portion of the horn, and means to conduct electrical energy to said wires.

OTTO H. PEARSON.